United States Patent [19]

Belokin, Jr.

[11] E Re. 30,367

[45] Reissued Aug. 12, 1980

[54] POWER TAKE-OFF FOR FLUORESCENT LIGHT FIXTURES

[76] Inventor: Paul Belokin, Jr., Rte. 4, Hayward, Wis. 54843

[21] Appl. No.: 954,562

[22] Filed: Oct. 25, 1978

Related U.S. Patent Documents

Reissue of:

[64] Patent No.: 3,989,335
Issued: Nov. 2, 1976
Appl. No.: 507,807
Filed: Sep. 20, 1974

[51] Int. Cl.[3] ..... H01R 33/08

[52] U.S. Cl. ..... 339/50 R; 339/153

[58] Field of Search ..... 339/50 R, 57, 95 R, 339/153, 154 A, 154 L; 362/217, 221, 225, 219

[56] References Cited

U.S. PATENT DOCUMENTS

| | | | |
|---|---|---|---|
| 2,195,154 | 3/1940 | Scott | 362/225 |
| 2,410,364 | 10/1946 | Rosenthal | 339/53 |
| 2,501,485 | 3/1950 | Tuck | 362/219 |
| 2,567,726 | 9/1951 | Pistey | 339/55 |
| 2,581,546 | 1/1952 | Mann | 362/221 |
| 3,137,448 | 6/1964 | Holzhause | 339/154 A |
| 3,436,716 | 4/1969 | Amis, Jr. et al. | 362/217 |
| 3,582,866 | 6/1971 | Johnson et al. | 339/50 R |
| 3,704,212 | 11/1972 | Piccola | 339/50 R |

FOREIGN PATENT DOCUMENTS

| | | | |
|---|---|---|---|
| 833911 | 5/1960 | United Kingdom | 339/153 |

*Primary Examiner*—Neil Abrams
*Attorney, Agent, or Firm*—James E. Nilles

[57] ABSTRACT

A self-contained, readily-attached electrical connector unit for fluorescent light fixtures is disclosed which hangs from and attaches to the separate prongs of a pair of single or double pronged fluorescent bulbs. The device provides a convenient means for providing auxiliary power e.g., connecting extra lighting or a motor for lighted or animated displays to ceiling fixtures and eliminates extraneous wiring and brackets normally used for these purposes, and further eliminates the use of battery-powered motors with these inherent shortcomings and expense.

In one embodiment a housing unit for an outlet plug and motor drive is disclosed having a pair or receptacle cups engageable over the ends of a pair of fluorescent tubes for making electrical connection to said outlet and/or motor. In another embodiment the receptacle cups are flexibly attached to the housing so as to be engageable with the prongs of variously spaced tubes. The receptacle cups are insulated and house cooperative conductor discs or connectors which make the electrical connections and are easily and safely attached and detached.

17 Claims, 28 Drawing Figures

FIG. 1
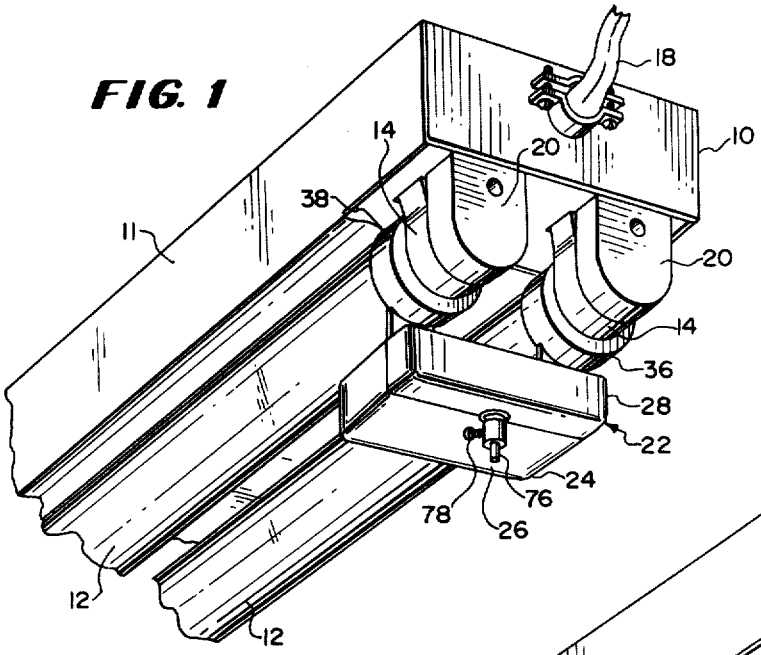
FIG. 2
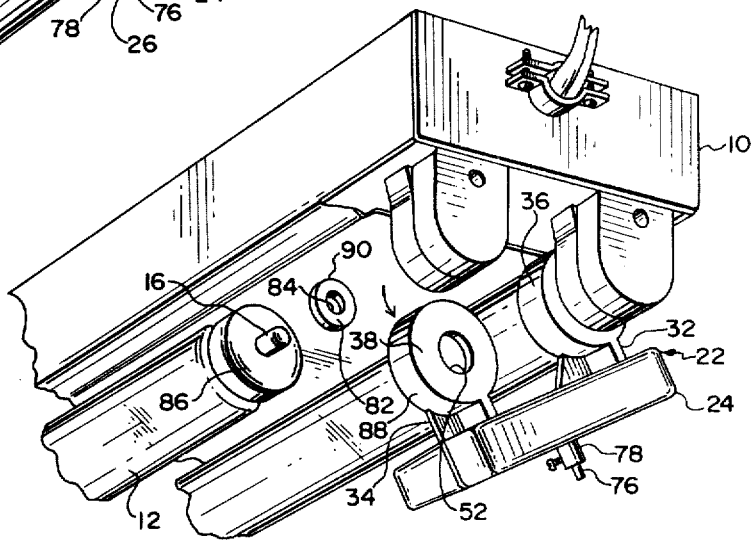
FIG. 3
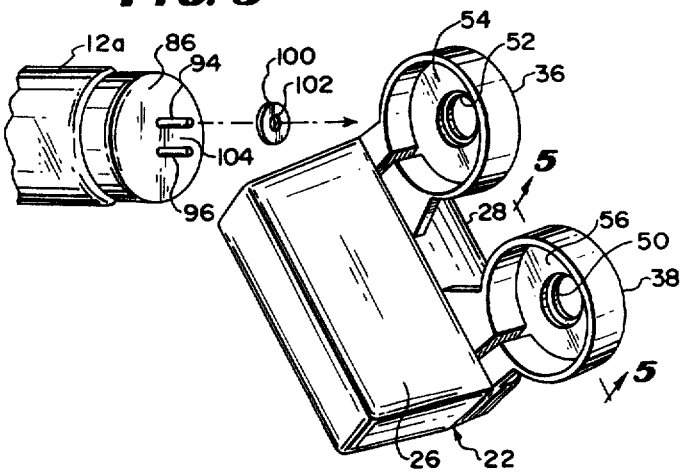
FIG. 4
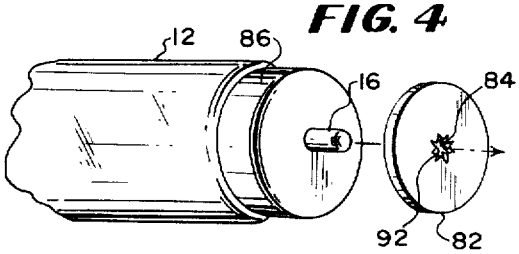
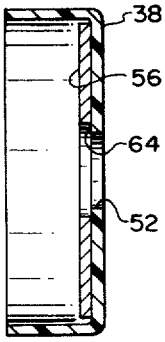
FIG. 5

FIG. 11
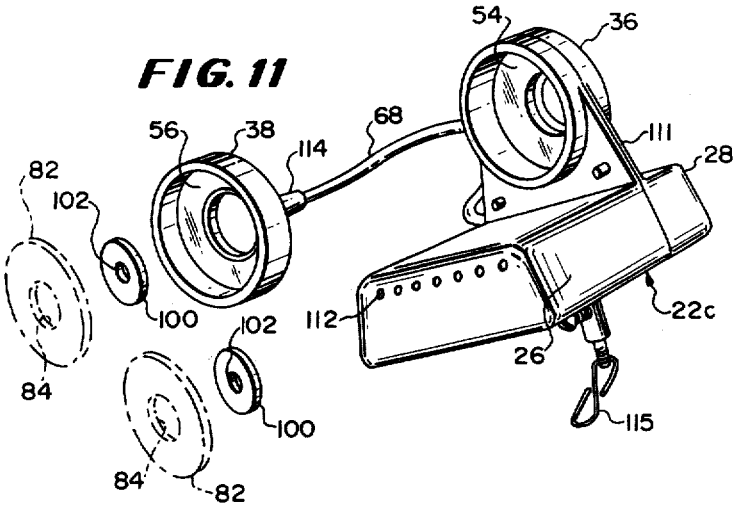
FIG. 12
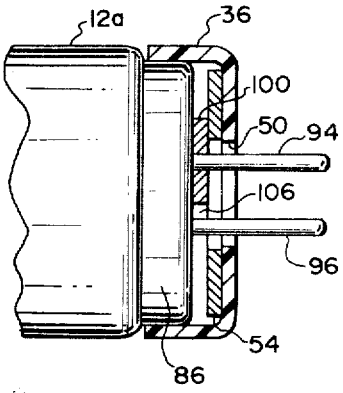
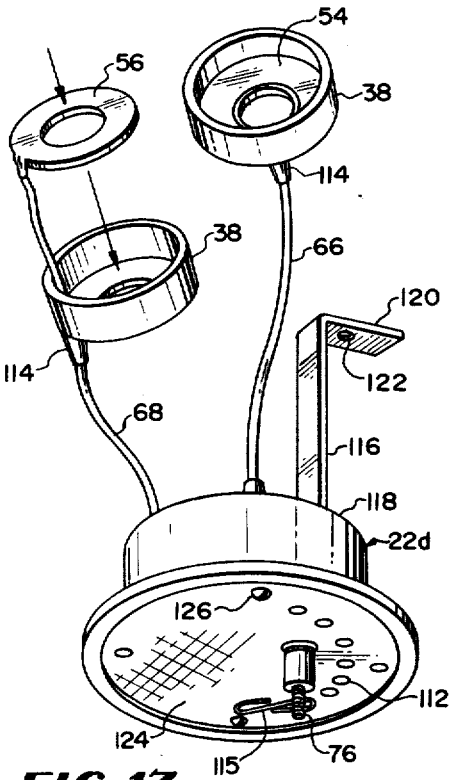
FIG. 13
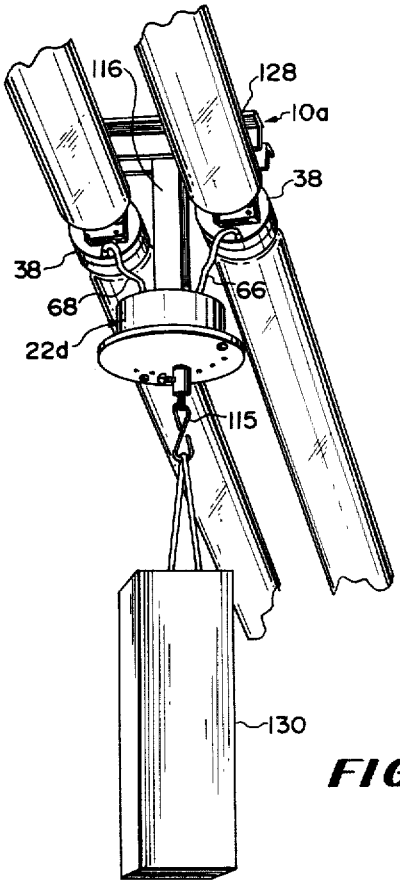
FIG. 14

FIG 15
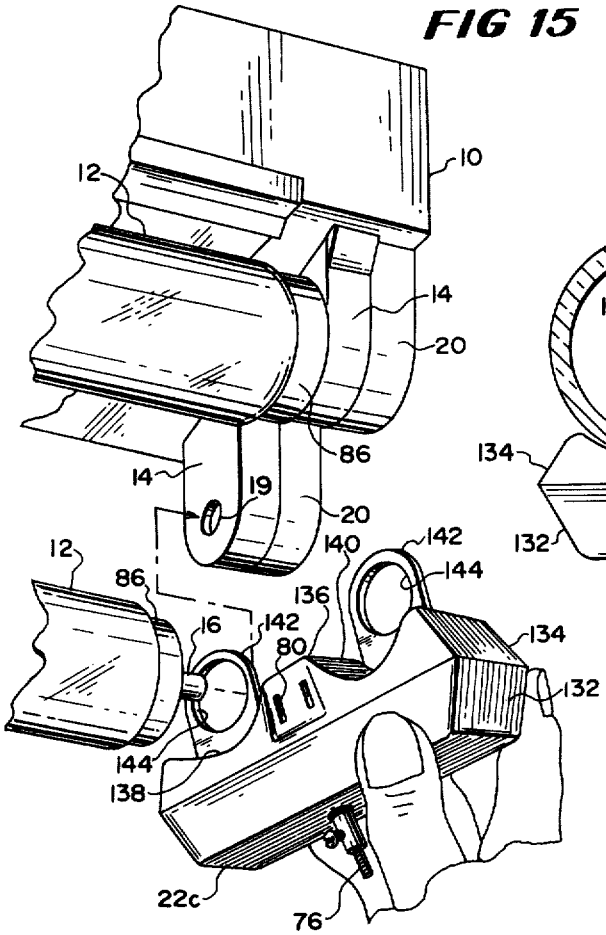
FIG. 16
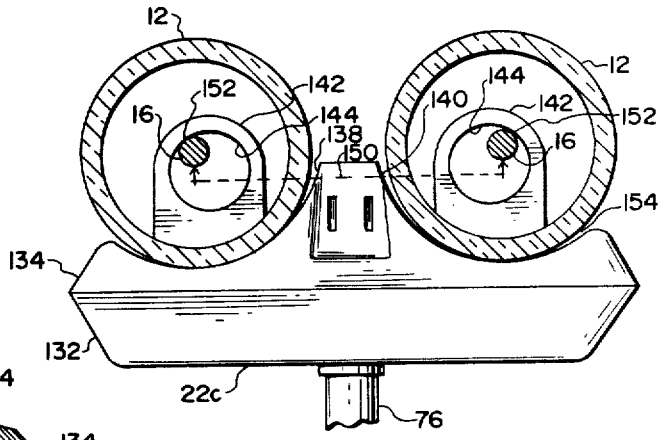
FIG. 17
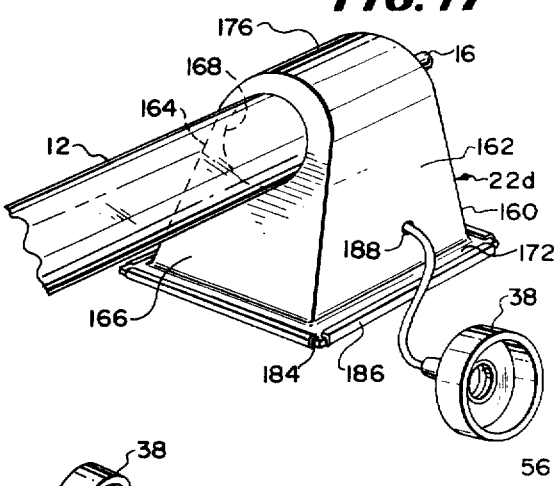
FIG. 18
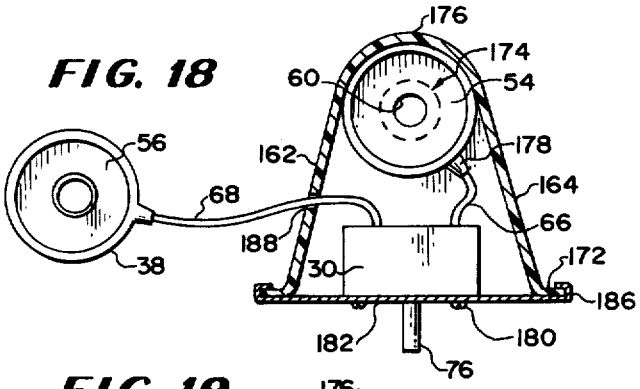
FIG. 19
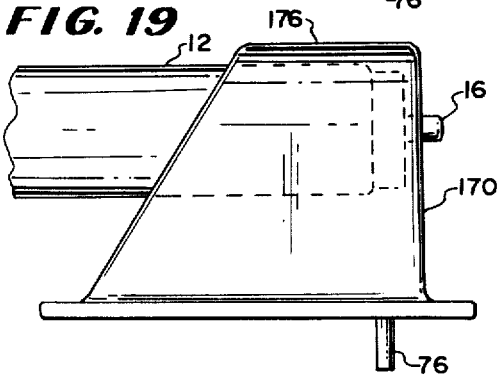
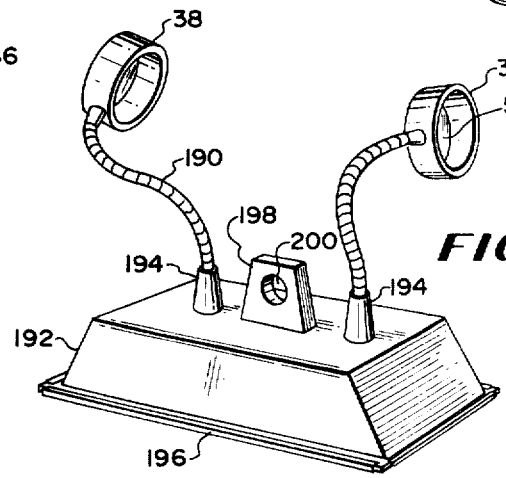
FIG. 20

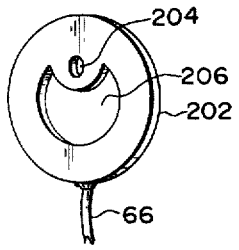
FIG. 21
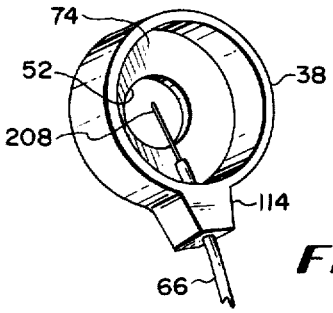
FIG. 22
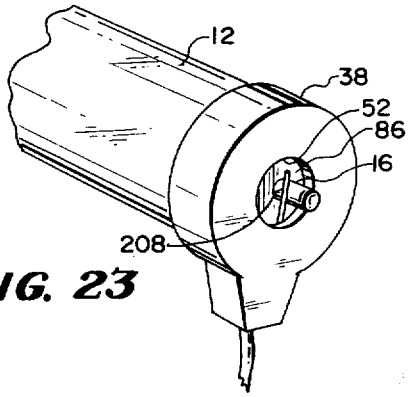
FIG. 23
FIG. 28
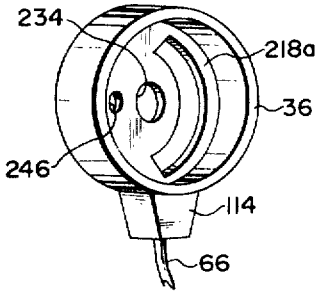
FIG. 24
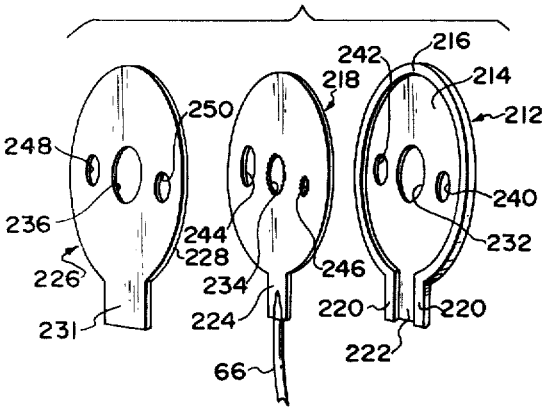
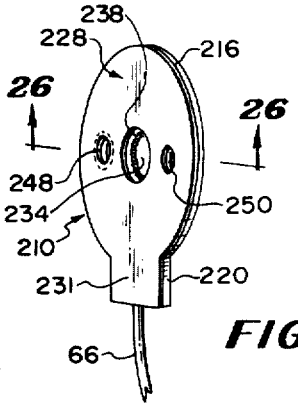
FIG. 25
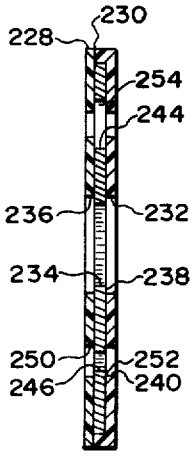
FIG. 26
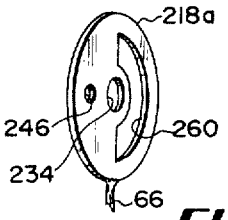
FIG. 27

POWER TAKE-OFF FOR FLUORESCENT LIGHT FIXTURES

Matter enclosed in heavy brackets [ ] appears in the original patent but forms no part of this reissue specification; matter printed in italics indicates the additions made by reissue.

BACKGROUND OF THE INVENTION

The art relating to fluorescent lighting fixtures and the brackets therefor make no provision for the attachment of any kind of foreign load thereto, although numerous mounting blocks, locking devices and holder means for these kinds of lamps are disclosed. JOHNSON et al U.S. Pat. No. 3,582,866 disclose particular structures for their three-layer paper-thin flat insulators at the ends of a pair of electrical leads adapted to attach to the pins of fluorescent tubes as power take-off means for a foreign load. These structures do not eliminate the unsightly leads or provide safe support for the foreign load.

In the connector art various clips, spring and slotted terminals are disclosed that are unrelated to the instant problem. Fast connect motors and electric clocks are disclosed using bayonet type connectors but each has trailing wires that are unsuitable for ceiling fixtures.

It is known that advertising displays require floor space and if such displays are lighted or animated by the use of electric motors, there exists the problem of the safe placement of the electrical cords therefor. When such displays are located in areas of public access such as display rooms, the presence of unsightly electrical cords is not only a problem but may become a safety hazard. One prior art usage has been battery-powered motors supported by ceiling display units. These are expensive, shortlived and present the problem of leakage of battery acid on any goods on the floor under the display if the batteries are discharged and not immediately replaced.

SUMMARY OF THE INVENTION

To overcome these problems this invention provides several forms of a compact adapter that is readily attachable to an existing fluorescent light fixture for the purpose of providing an outlet connector for added lights or direct connection to an electric motor, both of which are contained within the adapter. The invention eliminates unsightly and dangerous electrical cords and allows the illumination of displays directly at the fixture at or below the ceiling level so that display floor space is not used or cluttered.

The device of this invention includes several different forms of terminals that are designed to fit over or upon the protruding pins or prongs of either single pole or double pole (8' or 4') fluorescent tubes thereby placing the unit at the ceiling directly below the light fixture so that an auxiliary source of lighting or animation is made available where it is most noticeable and attention-getting as an advertising display.

In another form the invention utilizes a molded plastic and insulated unit which may contain a drive motor and/or an electrical outlet, having a pair of conductive disc-like terminals having holes therein whose centers are spaced less than or greater than the centers of the double prongs of a 4' fluorescent bulb. The terminals are conductive discs which allow the two prongs of the bulb to be inserted within the holes and the weight of the adapter brings the inner periphery of the holes into electrical contact with the prongs. Because the prongs do not center in the holes of the terminals, their peripheries contact the inner edges of the terminals at a camming angle which assures good and stable contact. Furthermore, the discs are thin enough to pass between the insulated head of the fluorescent bulb and the support so as to occupy the space therebetween without interferring with the insertion or removal of the bulb. The terminals are short enough so that they are not exposed to accidental contact and are covered by the arcuate insulating portions of the ceiling fixture.

In one form of the invention an insulating cap or cup is provided at the end of each terminal for the adapter which has a pocket to receive a conductive washer or disc with a hole larger than and spaced from the prong of a single pole fluorescent bulb. A second conductive washer or disc is applied to the prong, its hole being small enough to contact the prong. When the insulating cap is applied over the end of the tube, the washers make electrical contact and all conductive parts are covered by the insulating cap.

In still another embodiment of the invention the insulating caps are attached to the adapter by means of diverging legs or insulating cables which either have recesses to contain a lead wire connected to the first conductive washer or totally encompass the lead wire. The diverging legs or cables are resilient and may be weight supporting so that the pair of cups can be spread apart or brought into closer proximity, thus adjusting to the lateral and vertical spacing of the pair of single prong or double prong fluorescent bulbs from which power is to be tapped by the unit.

In still a further embodiment the insulating housing is adapted to encompass a portion of the fluorescent tube and form one terminal at an inner end, while the second terminal is elongated for attachment to a second tube.

The outlet that is included in the adapter or housing unit provides an auxiliary connection for low voltage loads and provides a place to check the voltage or presence of adequate current to the unit before any attachments such as auxiliary lights for display purposes are connected.

DESCRIPTION OF THE DRAWINGS

Illustrative embodiments of the invention are shown in the drawings wherein:

FIG. 1 is a fragmentary perspective view of a two-tube fluorescent ceiling fixture with one form of power take-off unit of this invention installed;

FIG. 2 is a view like FIG. 1 with one of the tubes disconnected from the fixture and with one of the terminals of the unit of this invention released therefrom also showing one of the conductor discs in spaced relationship with the related cooperating parts;

FIG. 3 is a fragmentary view of the end of a two-prong fluorescent tube in relation to the power take-off unit of FIGS. 1 and 2 with a smaller conductor disc shown in spaced relationship with related cooperating parts;

FIG. 4 is a fragmentary view of one end of a single prong fluorescent tube and a conductor disc therefor;

FIG. 5 is a cross-sectional view of one of the terminal means within a cup taken along lines 5—5 of FIG. 3;

FIG. 11 is an exploded view of still a further power take-off unit with the conductor discs necessary for 4-foot double conductor pin and 8-foot single pin tubes;

FIG. 12 is a partial cross-sectional view of a terminal cap showing the mode of contact with a double conductor pin tube;

FIG. 13 is a partially disassembled view of modified power take-off unit having a ceiling bracket and a different shaped housing for the motor;

FIG. 14 is a perspective view showing one mode of mounting the power take-off unit shown in FIG. 13;

FIG. 15 is a fragmentary perspective view of a dual tube ceiling fixture having single conductor pins with a further modified power take-off unit of this invention;

FIG. 16 is an end view of the unit of FIG. 15 showing the manner in which the unit hangs from the single conductor pins of a pair of tubes;

FIG. 17 is a perspective view of a further modified power take-off unit of this invention shown mounted on a single prong tube ready to hang from the ceiling fixture;

FIG. 18 is a cross-sectional view of the unit shown in FIG. 17;

FIG. 19 is a side view of the unit shown in FIG. 16 showing the relationship of the drive shaft with the pin support;

FIG. 20 is a perspective view of a modified power take-off unit having sheathed cables or the like over the leads;

FIG. 21 is a perspective view of a modified conductor disc for use with dual-prong tubes;

FIG. 22 is a fragmentary view of another form of cup and conductor tip which is in the form of a bore lead wire;

FIG. 23 is a fragmentary perspective view of the end of a tube showing the modified cup or cap or FIG. 22 attached to the end of a single prong tube with the base lead wire in canted spring contact therewith;

FIG. 24 is an exploded view of a still further modified connector as part of the power take-off unit of this invention;

FIG. 25 is a perspective view of the connector parts shown in FIG. 4 in assembled condition;

FIG. 26 is a cross-sectional view taken along the lines 26—26 of FIG. 25;

FIG. 27 is a plan view of another form of conductive disc that can be used for dual or single prong tubes; and FIG. 28 shows the conductive disc of FIG. 27 as used within an insulated cap or cup member which embodiment can be used to replace the other embodiments shown.

DESCRIPTION OF THE PREFERRED EMBODIMENTS

Figure 6:
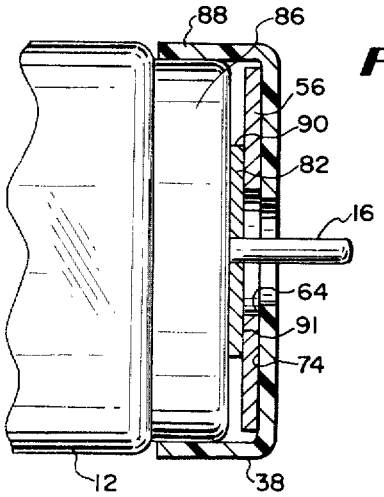
FIG. 6 is a partial cross-sectional view of a terminal place on the end of a single prong fluorescent tube.

Referring to FIGS. 1 and 2, there is shown a ceiling fixture 10 comprising a painted sheet metal housing 11 which attaches to the ceiling of a room to suspend the pair of fluorescent tubes 12 from the spaced depending fixture terminals 14 which are adapted to make electrical contact with the conductor pins 16 (one for each tube) through the conventional reactance ballast coils, thermal and glow started switches, etc., within the housing 11 to the main electrical power source illustrated by the electrical cable 18 suitably attached thereto. The fixture terminals 14 have suitable receptacles 19 (see FIG. 15) to receive the pin 16 and apertures 144 to make electrical contact so the tubes 12 light when installed. The fixture 10 includes the pair of back-up bosses 20 which rigidify the assembly. Any of the various types of ceiling fixtures are adapted to be used with the power take-off unit 22 of this invention, here shown in position upon and suspended from the ends of the tubes 12. The power take-off unit of this invention can be used with any commercial or home type fluorescent lighting array using elongated or adjacent circular tubes. Some installations which are enclosed by a glass or plastic light diffusing lens may require the drilling of holes therethrough at one end in order to provide for the entry of the lead wires. However, as will be seen from this description the insulated cap or cup members disclosed will readily attach to the conductor pins in the limited space provided in such units.

Fluorescent tubes are presently furnished in a variety of sizes and length as well as having different power requirements. Also they are installed in different arrays, there being single dual and multiple tube arrangements as well as tubes having a single conductor pin at each end and double conductor pins at each end. Generally the shorter tubes having lengths up to 4 feet are double pin or bi-pin tubes while longer tubes over 4 feet and up to 8 feet are single pin tubes. Such fluorescent tube installations generally place at least a pair of tubes in parallel spaced relationship and the unit 22 of this invention is adapted to be connected to any two adjacent tubes in an array for the purpose of tapping in an auxiliary load from the terminals. A majority of commercial lighting installations employ the longer single prong tubes with a common ground at one end connection and about 440 volts at the other end or generating end of the ballast. The shorter dual-prong tubes have a common ground at one end and about 220 volts at the other end from which any one pin of one tube can be connected with any one pin of an adjacent tube. For single tube installations with duo-prong auxillary, low voltage power is taken off a prong at each end of the tube. A pair of 20 watt fluorescent tubes can support an auxiliary load of about 6 watts such as a 60-watt incandescent light bulb or a 60 volt motor. A pair of 40-watt fluorescent tubes can support loads of 6 to 10 watts as illustrated by a 110 volt bulb or a 110 volt motor.

Further referring to FIGS. 1 and 2, the unit 22 is shown to comprise an insulated housing 24 preferably constructed of molded plastic characterized by its mechanical strength, thermal stability and excellent electrical insulating properties, such as nylon, any of the various Bakelites, acetal copolymers and homopolymers, acrylics, alkyds, allyls, poly-carbonates, urea, celluloses, epoxies and fluoroplastics.

The housing 24 is constructed in two parts 26 and 28, the former defining a compartment for the electric motor 30 (see FIGS. 7 and 8) and the latter having the pair of molded web flanges or bosses 32 and 34 with the integral circular molded cups 36 and 38 at their respective ends. The cups 36 and 38 define the rounded walled recesses 40 and 42 which are connected at their bottoms to the chamber 44 of the molded housing part 28 by means of the open-sided channels 46 and 48. Each cup has an opening indicated at 50 and 52 which are located substantially concentric with the walled recesses 40 and 42.

A pair of conductive washers made of copper or brass such as illustrated at 54 and 56 is provided of a size to fit snugly into each of the recesses 40 and 42 with their central bore holes 60 and 62 spaced slightly from the periphery of the openings 50 and 52 as indicated by the margin 64 in FIGS. 5 and 6. This spacing or margin 64 is optional and the openings 50 and 52 may be provided with an internal flange (not shown) which fits within the respective holes 60 and 62 in a snap-fit relationship since electrical contact with the pin 16 is not made at the periphery of these holes 60 and 62.

Figure 7:
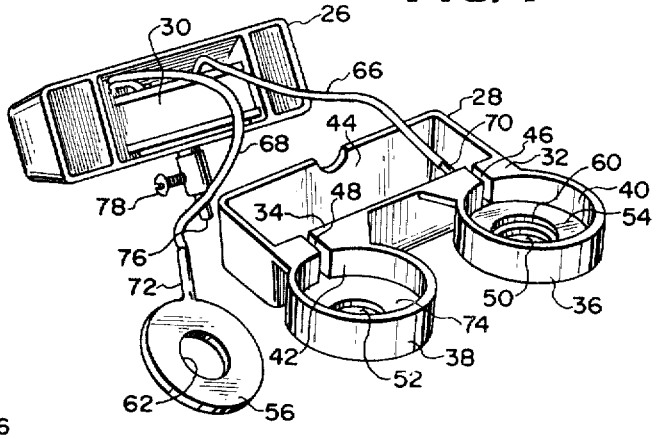
FIG. 7 is a perspective view of the two parts of the power take-off unit of FIG. 1 partially disassembled.

The conductive washers or discs 54 and 56 are connected to the conductive and suitably insulated lead wires 66 and 68 by attachments 70 and 72 to complete the electrical connection to the motor 30. With the conductive washers 54 and 56 in place within the recesses 40 and 42, the lead wires extend through the slots or channels 46 and 48. In FIG. 7 the conductive washer 56 is shown removed from the cup 38 to illustrate the simplicity of the construction and reveal the bottom flat wall 74 of the cup 38 against which the washer is held. The drive shaft 76 of the motor 30 extends through the bottom wall the housing parts with means 78 for the attachment of a revolvable advertising display (not illustrated). If desired, connection (not shown) between the lead wires 66 and 68 can be made to the outlet 80 for additional power take-off. Switch means for the motor 30 can also be included in the assembly for some uses although preferably the units are furnished without a switch so that they are operable when power is supplied to the fluorescent tubes by a wall switch.

One mode of connection for a single pin tube is shown in FIGS. 2 and 6, wherein the second conductive washer 82 having the central bore 84 is mounted over the single pin 16 of the tube and with the cup 38 fitting over the end cap 86 of the tube in close fitting relationship by means of the encompassing flanged edge 88. The bore 84 of the washer 82 fits snugly over the pin 16 to insure electrical contact. The outer edge 90 of the washer 82 is spaced from the inside of the housing edge 88 and two washers are held in electrical contact with each other as shown by the juncture 91 in FIG. 6, thus tapping current from the pin 16. Two such washers 82 are used, one for each tube.

The lateral spacing of the cups 36 and 38 is such that they will each engage the normally spaced tubes 12 as illustrated in FIG. 1 without interferring with the attachment of the tubes themselves to their outlets 14.

To install the unit 22 all that is necessary is to place a conductive washer 82 on the pins 16 of the tubes 12, then place one of the cups over one of the tube ends, with the washers 54 or 56 in place, snap in that tube, place the other cup over the other tube end and snap that tube in place. There is sufficient space between the end caps 86 of the tubes 12 and the connectors 14 to accommodate the cups in the manner illustrated. The wall thicknesses of the stacked washers and the bottom wall 74 of the cups need not be more than 0.125 inch and most installations will accommodate greater thicknesses for these parts. There is some play at the other ends of the tubes because of the internal construction of the fixture terminals 14 that can be used to provide further room for this attachment. Also the spacing between adjacent tubes is about 2½ inches on center so that the unit 22 can be dimensioned to fit most fluorescent fixtures. In one embodiment the washers 82 are provided with serrations 92 about the center bore 84 as shown in FIG. 4 which define an effective diameter less than the diameter of the pins 16 whereby to grip the pins in a tight relationship when the washers are pushed thereon.

FIG. 3 shows a modification wherein the basic unit 22 with its washers 54 and 56 in place within the cups 36 and 38 can be used with a fluorescent tube 12a having the pair of pins 94 and 96. In this instance it is necessary to tap current from one pin of one tube and another pin of the next adjacent tube. For this purpose a smaller conductive washer 100 is used. The washer 100 has a central bore 102 that fits over the smaller pin 94 in a snug fitting relationship but the radius of the washer is less than the distance 104 between the pins 94 and 96 so that when the washer is installed on the pin 94, for example, it does not touch the other pin 96. The relationship of the unit 22 when used with the smaller washer 100 is shown in FIG. 12 with the cup 36 in place on the tube 12a. The washer 100 sandwiches against the washer 54 while in contact with the pin 94 and carries electricity therefrom to the motor 30, the outlet 80 or both. As shown the space 106 is about one-half the distance 104 so that contact is made with a selected pin 94 only, while the second pin 96 extends through the hole 50 in spaced relationship.

The single pins 16 of the tubes 12 are larger in diameter than the dual pins 94 and 96. In either case the respective conductive washers fit thereon in a sliding, firm contact to make a positive connection.

Figure 8:
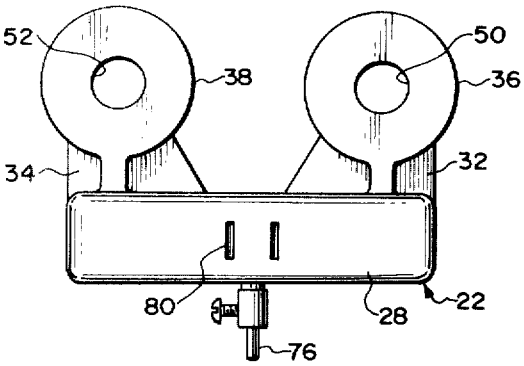
FIG. 8 is a plan view of the outer side or end of the power take-off unit.

FIG. 8 further illustrates the compactness of the take-off unit 22 which remains in close association with the ceiling fixture and provides easy access to the bastard-sized outlet 80 for additional low-voltage load.

As before stated the center-to-center distance between the openings 50 and 52 of the cups 36 and 38 accommodates most adjacent pairs of tubes. In those instances where more flexibility in accommodating pairs of tubes having wider or more narrow spacings is required, the modified power take-off unit 22a is provided, shown in FIG. 9, with elongated resilient or flexible bosses or extensions 32a or 34a. So formed the cups 36 and 38 may be contracted toward each other or spread apart to fit narrowly spaced or wider spaced tubes as indicated by the arrows. Aside from the inclusion of the flexible bosses, which incidently house the leas wires 66 and 68 in the manner shown in FIG. 7, the structure of the unit 22a is the same as illustrated in FIGS. 1-7 and can be used with tubes having one or two pins. Here however, the plastic used will be compounded to provide strength combined with flexibility so that the spreading function is included.

Figure 10:
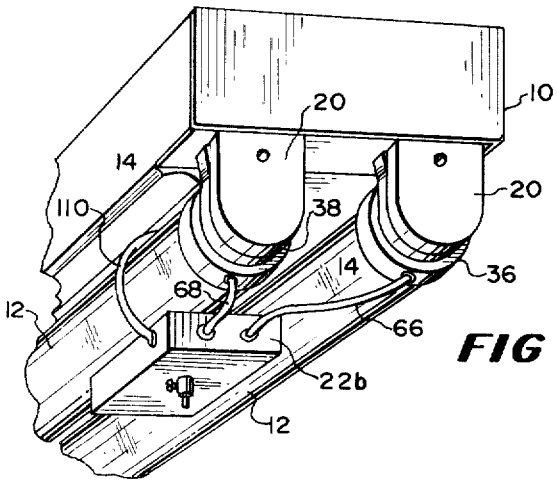
FIG. 10 is a fragmentary end view of a two-tube fluorescent fixture with a modified power take-off unit in place.

In FIG. 10 still anothr embodiment is shown wherein the cups 36 and 38 are formed as separate pieces, the bosses 32 and 34 being omitted, with the insulated lead wires 66 and 68 exposed and constituting the mechanical and electrical connection to the unit 22b. In this embodiment the cups 36 and 38 are connected to either single pin or double pin tubes 12 supported and connected to fixture 10 with the plastic connection band 11o encompassing one of the tubes as the support for the unit. This band can be a hook or completely encompass the tube as desired. Here again combined strength and flexibility will be necessary in compounding and selection of the plastic used.

FIG. 11 shows another modification wherein the unit 22c has the two compartments 26 and 28 formed with separate planar bosses joined together to form the central single boss 111 defining, at their ends, one of the cups 36 while the second cup 38 is connected by means of its lead wire 68. The respective recessed washers 54 and 56 are shown in place within the cups. The pair of larger washers 82 (shown in broken lines) with their smaller center bores 84 to fit upon the single pins 16 of 8 foot tubes or other single pin tubes are shown, along with the pair of smaller washers 100 with their smaller center bores 102 to fit upon the smaller diameter pins of two-pin tubes are also shown, to complete the parts necessary for either installation. The other parts remain the same, except that in this instance, the holes 112 are provided for ventilation of the motor. An outlet 80 can be provided on the outside wall of the unit 22c as desired. A further modification can include the integral nipple 114 for the lead wire 68 for the cup 38. The wire hanger 115 can be used to attach an attention-getting advertising display or the like to the motor shaft.

In FIGS. 13 and 14 still another type of power take-off unit 22d is shown having the U-shaped bracket 116 attached to the round plastic housing 118 by means of a screw (not shown) with the flange end 120 provided with the hole 122 for attachment to the ceiling adjacent the fixture for the tubes. Here thin washers 54 and 56 with their lead wires 66 and 68 are illustrated in use with a pair of cups 38, as shown in FIG. 11, modified to include the nipples 114 to receive the lead wires attached to the washers 54 and 56. The motor drive shaft is off-center in this embodiment and the vent holes 112 are located in the bottom metal plate 124 which is held thereto by the screws 126. The metal plate 124 functions as a heatsink for the motor to dissipate heat during its operation.

FIG. 14 shows the unit 22d of FIG. 13 attached to the modified ceiling fixture 10a having suitable flanges 128 over which the flange 120 engages to support the unit. The wire hanger 115 in this instance is supporting a display 130 which can represent a product weighing as much as 6 lbs. without undue strain on any parts.

In FIGS. 15 and 16, still another modified power take-off unit 22c is shown wherein the molded housing parts 132 and 134 are of a different configuration, the motor being in the lower part 132 with its shaft 76 extending down through the bottom while the upper part 134 has the molded central boss 136 for the outlet 80 and defines the rounded shoulders 138 and 140 on each side which conform to and receive the end caps 86 of the single pin tubes 12, as shown in FIG. 16.

This unit 22c has the pair of identical terminals 142 formed of thin conductive metal with enlarged apertures 144, the centers of which are closer together than the center-to-center distance 150 of the pins 16 of the adjacent tubes 12. The unit is hung upon the pins 16 by means of the pair of terminals 142 by means of the apertures 144 and when the tubes are connected to the receptacle 14, the unit assumes the relationship shown in FIG. 16. The apertures 144 cam against the pins at the junctures 152 making a good electrical connectin due to the weight of the unit. A short arcuate space 154 is provided between the tubes 12 and the contoured shoulders 138 and 140 in order to allow proper clearance for easy installation.

Since the terminals 140 and 146 are thin and flexible they do not interfere with the connection of the pins 16 with the receptacles 14 and once in place the housing part 134 with its rounded portions 136 and 140 encloses the connection so that accidental contact with the hand or fingers is prevented. It is apparent that the center-to-center distance between the apertures 144 by the terminals 142 can be greater than the distance 150 and still retain the camming contacts 152 for good electrical connection. Either the foreging center-to-center relationships can be used. For that matter these center-to-center relationships can be the same in which event electrical contact at the points 152 will be at the tops of the apertures 144 and primarily dependent on the forces of gravity.

In FIGS. 17, 18 and 19 still a further embodiment 22d of the invention is illustrated to include the open-bottomed plastic insulating housing 160 having elliptical side walls 162 and 164 with the slanged end wall 166 having the elliptical apertures 168 therein and the other edn wall 170 being substantially vertical to the peripheral flange 172 about the open-bottom. The wall 170 has a suitable aperture 174 therein axially oriented with the elliptical aperture 168 so as to receive the tube 12 with the rounded top portion 176 resting on the top of the tube and with the pin protruding therefrom. The aperture 174 need only be slightly larger than a pin 16.

One of the thin disc contacts 154 is shown mounted over the aperture 174 with its central bore hole 60 axially oriented thereacross. In this instance the disc 54 can be held in place against the inside of the wall 170 by any means including an adhesive or a flanged recess (not illustrated). The lead 66 therefrom, in this instance shown to be soldered to the disc 54 at 178, connects to the motor 30 which is suitably mounted as by the screws 180 to the metal plate (heatsink) 182.

The plate 182 is larger than the flange 172 of the housing 160 and has its corners cut out at 184 to form the crimped edge 186 thereover.

The second electrical lead 68 extends throgh the side hole 188 in the wall 162 and has the cup 38 at the end thereof with its thin disc contact 56 in place therein. The lead 68 would connect to an adjacent tube 12 (not illustrated). The bore hole 60 of the disc 54 can be altered so as to fit over the pin 16 in snug sliding contact if desired as shown in FIG. 4 and used without the disc 82 (of FIG. 6) for a single pole tube. This same arrangement can be used in the cup 56, shown in FIG. 18. However, the use of the double contact disc arrangements of FIGS. 6 and 12 is preferred since assembly is facilitated and once a disc 82 or 100 is used no further attention need be paid to the effect of the weight of the unit on these contacts. The unit 22d can also be modified for double pin or pole tubes in accordance with these teachings. The motor 30 includes reduction gearing in the drive connection to the shaft 76, which places it offcenter from the motor itself. In placing the motor 30 in the housing 160, advantage can be taken on this off-set to place the shaft 76 nearly in the plane of the outer wall 170 and the pin 16 so that the major portion of the weight of a display item 130, supported by the shaft will be under the wall 170 as shown in FIG. 19.

Figure 9:
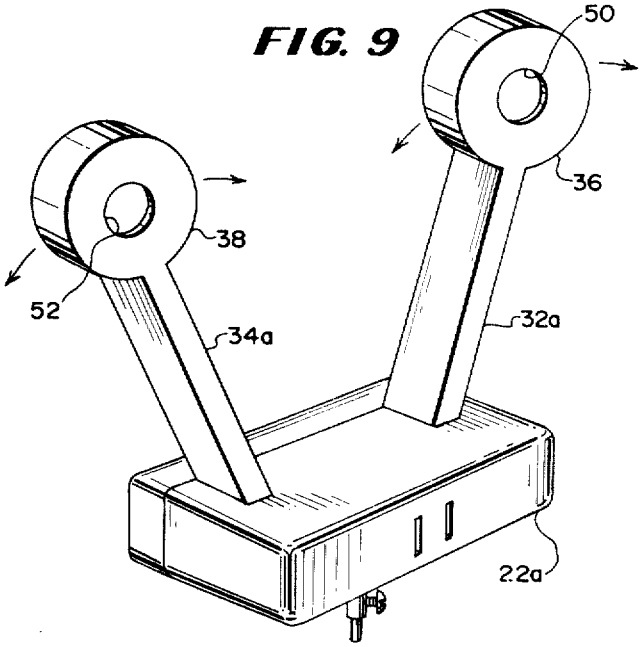
FIG. 9 is a perspective view of a modified unit having flexible extension arms attaching the terminal caps to the housing so as to accommodate fluorescent tubes having variable spacing.

FIG. 20 illustrates a further embodiment of the invention which relates to FIGS. 9–11, 13, 14 and 17–19, wherein the supporting flexible flanges 32a and 34a of FIG. 9, the leads 66 and 68 of FIG. 10, the lead 68 of FIG. 11, the leads 66 and 68 of FIG. 13 and 14, the lead 68 of FIG. 18 can be sheathed in a strong protective and weight supporting housing 190 extending from the housing 192 through the nipples 194 and having at their ends the cups 38 heretofore described. The housing 192 is provided with a metal bottom 196 attached like the bottom 182 of FIG. 18. If desired a flange 198 can be provided at the top with an aperture 200 for attaching an auxiliary bracket (not shown).

In this case the sheathing 190 for the leads can be flexible, twisted metal like BX conduit for the purpose of providing both electrically safe protection for the leads and an increase in the weight supporting characteristics of the installation. This will allow the unit to be installed safely between tubes mounted in the same plane but at varying distances apart or to tubes in the different planes and also at varying distances apart.

Although the invention has been described in relation to the use of disc type contacts for both single pin and double pin tubes, in those instances where the electrical specifications do not require absolutely shockproof connections and it is expedient cost-wise to use some other form of clip for attaching the leads to the pins, the discs illustrated can be in the form of wire loops or U-shaped spring clips at the ends of the leads 66 and 68.

Accordingly, it is seen that for single-pin tubes, the arrangement illustrated in FIG. 6 can be used, or as above described, the small conductive washer or disc 82 can be omitted and direct attachment to the single prong made by means of the disc 54. The conductive disc 82 of FIG. 4 can be used in place of the disc 54 of FIG. 18 with the lead 66 attached thereto as by the solder joint 178.

When the discs 54 and 56 are used for duo-pin tubes the distance 104 between the pins 94 and 96 is of course less than the diameter of the holes 50 and 52 to provide adequate insulating space around the unused pin. The various units 22 are readily connectable to fixtures which require rotation of the tubes 12 in the connectors 14 to register the pins 94 and 96 with the terminals therein without disruption of the disc-to-disc or disc-to-pin contact.

The low voltage foreign or auxiliary load applied to the circuit by means of this invention will not burn out the ballast since it is in series with the tubes. Too great a load will only cause dimming of the tubes. Examples of auxiliary loads are neon tubes, Italian lights, clock motors, hyperteresis motors like the motor 30. Loads up to about 40 watts at various voltages are normally accommodated meet most advertising and display purposes. The device of this invention allows one to check the current supply through the bastard outlet 80 and is turned on and off with the tubes so that no special attention need be paid to the unit once it is installed.

Although the invention would normally be used with fluorescent tubes, in a ceiling fixture, the actual presence of the tube therein is not essential as long as some means is used to hold the pins in contact with the respective outlet brackets 14. Thus a piece of wood or other elongated member, even a burned out tube can be used, to provide the pins to which the power take-off unit is connected.

Further modifications of the invention are shown in FIGS. 21, 22 and 23. The disc 202, as shown in FIG. 21, can be used in place of both of the discs 54 and 100 in any one cup 36 or 38 for use with dual-prong tubes as shown in FIG. 3. In this instance the disc 202 is the same size as the discs 54 or 56 and fits within a cup 36 and 38 in the same manner with its lead wire 66 or 68 extending through the slots 46 and 48 as before described. The small aperture 204 is adapted to fit upon a pin 94 in sliding frictional electrical contact while the larger aperture or hole 206 is spaced around the adjacent pin 96. The aperture 206 is shown to be moon-shaped although this aperture can be any shape as long as it does not touch the other pin 96.

In FIGS. 22 and 23 there is illustrated a further modification in which a cup or cap member 38 with a radially extending nipple 114 receiving a lead wire 66 is shown. The lead wire 66 has its bare end 208 extending substantially diametrically across the bore hole 52 and in a plane adjacent to the end wall 74. When the cup 38 is placed on the end of a tube 12 the bar end 208 of lead 66 is bent aside and cams against the single pin 16 as shown in FIG. 23.

FIG. 24 is an exploded view of a modified connector 210 as shown in FIG. 25. The connector 210 comprises the insulating plastic disc 212 having a flat wall 214 bordered by the flanged edge 216 which defines a recess to receive the thin metal disc-like conductor 218. The flanged edge 216 is interrupted at the bottom to define the pair of spaced flanges 220 defining a joining recess 222. The conductor disc or plate 218 has the solder lug 224 to which a lead wire 66 (or 68) is fastened as by soldering.

The plate 218 is adapted to fit within the recess defined by the flange 216 against the wall 214 with its solder lug 224 extending through the joining recess 222.

The connector 210 includes a cover disc 226 having a peripheral edge 228 which conforms with the curvature and size of the outside of the flange 216 so that it overlaps said flange as shown in FIG. 26 at the juncture 230 which can be heat-sealed or solvent glued to form a thin insulating enclosure for the conductor disc 218. The tab 231 completes the enclosure.

Each of the foregoing components has a larger central bore indicated at 232 in the plastic disc 212, at 234 in the conductor disc 218 and at 236 in the cover disc 226. The bore hole 234 is adapted to engage over the single pin or prong of a tube 12 and make electrical contact therewith in the manner of the disc 82 of FIG. 4. The bore holes 232 and 236 are aligned therewith and made slightly larger as shown in FIG. 26 so that a small margin 238 of the disc 218 extends radially in from the bore holes in the assembled condition of the connector 210 for contact with a single pin 16.

Each of the foregoing components has a pair of smaller bore holes for use with double pin tubes 12a. These are illustrated by the diametrically spaced bore holes 240 and 242 in the flanged disc 212, by the slightly larger bore hole 244 and the small bore hole 246 in the conductor 218, also diametrically opposite the bore hole 234 and the pair of diametrically positioned bore holes 248 and 250 in the cover disc 226.

As shown in FIG. 26, in the assembled condition, the bore hole 246, which is adapted to fit over one of the double pins 94 or 96 of a dual-prong tube 12a in electrical contact is concentric with the bore holes 240 and 250 leaving a margin 252 exposed to insure such contact. However, the remaining bore holes 242 and 248 which also align with one another and encompass the second pin in insulated relationship define a margin 254 around the bore hole 244 which is larger in diameter than this latter bore hole. Thus, the second pin is insulated from the conductor disc 218 and electrical contact is made with only one of the pins.

The connector 210 is preferably round as illustrated, although other configurations can be used, and is about the same diameter as the base portion 86 of a tube 12 or 12a so that its appearance is enhanced and its functionality, i.e., ease of placement on the end of a tube in not impaired. Two such connectors would be used, one for each of the lead wires 66 and 68 and one or two of the assemblies can be used with the embodiments of FIGS. 10, 11, 13, 14, 17, 18 and 20.

In FIG. 27 a further modified conductive disc 218a is shown which can be used in place of the disc 218 of FIGS. 24 and 26, or as is now readily apparent, as a modification of the disc 202 of FIG. 21, or to replace the discs 54 and 56 in combination with the discs 82 and 100 shown in the other embodiments. The disc 218a has the lead wire 66 or 68 attached at its periphery in the usual manner, includes the small aperture 246 for engagement in electrical contact with a pin 94 or 96 of a dual pin tube 12a, the central larger bore 234 to engage a single pin 16 of a tube 12 in electrical contact and an arcuate opening 260 extending about 180° around the opposite side of the disc from the bore 246 to encompass a second pin 94 Or 96 of a dual-pin tube 12a. Since the disc 218a will be used within an insulated cup 36 or 38, the positioning of the bore 246 over one pin 94 (for example) will automatically place the second pin 96 centrally within the arcuate opening 260 with no possibility of contact with its side edges.

FIGS. 28 illustrates the manner in which the modified disc 218a can be molded within a cup 36 (and 38) with its lead wire 66 (or 68) encased within the boss 114 extending from the side thereof for use with either single or dual-pin tubes. As before described, the modified conductive disc 218a can be formed without the small bore 246 and the arcuate opening 260 for use with single pin tubes 12.

Alternatively, the central bore 234 can be omitted and the disc 218a used for dual-pin tubes. Furthermore the conductor end portions and conductor discs of one embodiment shown in the drawings can be used with the insulaed cups or encasing housings of another embodiment with little modification of the parts. Thus the conductor disc 202 of FIG. 21 can be used with an insulating plastic disc 212 by merely providing corresponding holes in the flat wall 214, the smaller of which is only slightly larger than aperture 204 so as to make contact with one of the pins 94 or 96 and a larger arcuate or moon-shaped hole to provide an inwardly directed margin around the aperture 206 so that no electrical contact is made with the other pin. Corresponding holes or apertures would be provided in the cover disc 226. The plastic disc 212 and the cover disc 226 can be sandwiched over a lead wire 66 having a bare end protruding over a pair of aligned single holes in these encasing parts. The embodiment of FIGS. 24 and 25 can be used without the cover disc 226 and the cover disc 226 can fit within the flanged edge 216 instead of upon it.

The invention therefore provides a power take-off unit for fluorescent tube receptacles wherein the adjacent ends of variously spaced tubes and their associated protruding conductor pins are used to connect a foreign load, and includes the electrically insulated housing which may contain, be associated with or indirectly accommodate, the foreign load and the pair of spaced conductor means extending from the housing that readily attach to the pin or pins of the tubes by means of connector means, the conductor parts of which are partially or entirely enclosed and insulated at the juncture to meet the most stringent electrical standards. The proximity of the insulating housing to the connectors and the structures of the connectors, with or without elongated flexible bosses or Greenfield type of supporting cable attachment, elminates any safety hazards. The electrical connectors for the pin or pins of the tubes can be used without the housing 24 and associated foreign load e.g., the foreign load can be remote from the fixture 10 or one of the end portion structures for the conductors can be used at one end of a fluorescent tube and another used at the opposite end of the same tube in the manner of JOHNSON et al., U.S. Pat. No. 3,582,866 in a parallel circuit. Such usage defeats in part the elimination of hanging wires which are unsightly and does not necessarily meet all of the present electrical standards.

It is of course apparent that in all embodiments the motor 30 can be omitted and the various housings 22 used for outlet 80 which provides a remote connection to any motor, light source or the like as the foreign load through a separate lead wire plug. For this purpose the outlet 80 can be the standard variety so that standard appliances can be connected.

What is claimed is:

1. A power take-off unit for a [dual tube] fluorescent fixture wherein the adjacent ends of [the] laterally spaced tubes and their associated protruding conductor pins receive electrical power by electrical contact with fixture terminals *and* are used for delivering electrical power to a foreign load, comprising:

[an electrically insulated] *a* housing member adapted to accommodate said foreign [electrical] load;

a pair of spaced conductor members having end portions and extending from said housing member with the length of the [connection and] *conductor members including* end portions substantially less than the length of one of said tubes;

each of said [conductor] end portions including *an* electrically conductive disc [portions] *portion* adapted to detachably engage in electrical contact with *one of* said conductor pins at said adjacent ends to utilize voltage differential between the electrical potentials supplied separately to the pins of adjacent tube ends by the generating ends of their ballasts; and a layer of insulating [plastic] *material* on at least one side of each disc *portion* having a flange portion protectively enclosing the marginal edge portions of the disc *portion* and of a diameter approximately that of the end of [the] *a* tube, the other ends of said conductor [means] *members* being connected [to said housing] for energizing said foreign load.

2. A power take-off unit in accordance with claim 1: including within said housing *member* an electric motor connected to [the] *said* other ends of said conductor members as said foreign load.

3. A power take-off unit in accordance with claim 1 in which the layers of insulating [plastic] *material* are formed as a pair of insulating cap members adapted to fit over the ends of each of said tubes; and

[said disk] *the disc* portions of said conductor members connectable to said pins are each housed within one of said insulating cap members.

4. A power take-off unit in accordance with claim 1 adapted for use with single-pin tubes in which:

said end portions of said conductor members comprise [flat conductive strips] *disc portions* having [an aperture] *apertures* therein larger than the diameter of said pins and protruding in coplanar relationship from said housing member whereby to engage over said pins and make peripheral contact therewith under the weight of said unit.

5. A power take-off unit in accordance with claim 4 in which:

the center-to-center spacing of said apertures is different than the center-to-center spacing of said pins of said pair of tubes whereby the weight of said unit brings said apertures into camming peripheral contact.

6. A power take-off unit in accordance with claim 5 in which:

said housing *member* defines a pair of spaced arcuate recesses in a top wall thereof;

one of said recesses being at the base of each of said conductive [strips] *disc portions;* said recesses conforming to and encompassing the lower portions of adjacent ends of said tubes.

7. A power take-off unit in accordance with claim 1 in which:

said housing *member* defines a pair of bosses having cap members at the ends thereof with passageways communicating through said bosses to the inside of said housing *member* to contain said conductor [means] *members;* said cap members each defining a cupped recess with a peripheral wall and an end wall and being adapted to fit over the adjacent ends of said [tube members] *tubes;* an aperture in the end walls of each of said cap members adapted to encompass the protruding conductor pins of each of said [tube members] *tubes* in spaced relationship;

said end portions of said conductor members comprising flat apertured conductive discs contained in said cupped recess with one side thereof against said end wall and with the apertures thereof extending subtantially concentric with each of the apertures of said end walls; and a separate pair of apertured conductive discs adapted to fit upon a pin of each of said tubes, with the peripheries of said apertures in contact with said pins;

whereby said cap members on being placed upon the adjacent ends of said tubes hold said conductive discs on each pin in contact with said conductive discs contained in said cap members as the power take-off connections thereof.

8. A power take-off unit in accordance with claim 7 adapted for use with fluorescent tubes of the single-pin type wherein:

the apertures of said conductive discs within said cap members are substantially concentrically spaced from each conductor pin of said tubes; and said separate conductive discs peripherally overlap the apertures in said conductive discs within said cap members as the power take-off connection thereof.

9. A power take-off unit in accordance with claim 7 adapted for use with fluorescent tubes of the double-pin type wherein:

the apertures of said conductive discs within said cap members encompass and are spaced from each pair of pins on a tube and the apertures of said separate conductive discs encompass and make electrical contact with one of said pair of pins on each tube with their peripheries spaced from the other pin.

10. A power take-off unit in accordance with claim 7 in which:

one of said bosses is a flexible elongated member to accommodate fluorescent tubes of different spacing.

11. A power take-off unit in accordance with claim 10 in which:

said flexible elongated member comprises a protective sheath.

12. A power take-off unit in accordance with claim 1 for use with tubes having single and double conductor pins wherein:

said end portions of said conductor [member] *members* each comprise:

a conductor disc encased in a flat insulated housing;

at least three diametrically spaced bore holes extending through both sides of each of [said] *the* insulated housings and [said] *the* conductor discs therein;

the innermost bore hole being centrally located and adapted to encompass and make electrical contact with the single conductor pin of a tube; and one of the outer bore holes being adapted to encompass a conductor pin of a dual-pin tube in electrical contact therewith; and the other of [said] *the* outer bore holes being adapted to encompass the second conductor pin of a dual-pin tube in insulated relationship.

13. A power take-off unit for fluorescent tube receptacles wherein the adjacent ends of spaced tubes and their associated protruding conductor pins are used for delivering electrical power to a foreign load comprising:

[an electrically insulated] *a* housing member adapted to accommodate said foreign load;

said housing member having a pair of opposed spaced walls;

one of said walls having a bore hole to receive the conductor pin end of [said] *a* tube and the other of said walls having a bore hole to receive and pass over the outside of said tube as support for said housing *member;* a pair of conductor members each having end portions adapted to detachably contact and connect with a pin of said tubes at their adjacent ends;

one of said conductor members having its end portion encompassing said bore holes in said one wall of said housing member to detachably connect with a conductor pin of said tube as said housing *member* is placed in said supported position;

the other of said conductor members extending from said housing *member* for attachment of its end portion to a pin of the other of said tubes; and the other ends of said conductor members being connectable to said foreign load.

14. A power take-off unit in accordance with claim 13 in which: [said] *the* end portion of said one conductor member comprises an apertured disc, the aperture of which is substantially concentric with the bore hole in said one wall; and a separate apertured disc is provided to fit upon a pin of said tube with the inner periphery of its aperture in contact therewith, said apertured discs being moved into face contact as [said] *the* tube is inserted through said housing *member* with the pin thereof into electrical contact with the receptacle.

15. A power take-off unit for [fluorescent] *fluorescent* tube receptacles wherein the adjacent ends of spaced tubes and their associated protruding [single]

conductor pins are used for delivering electrical power to a foreign load comprising:

[an electrically insulated] *a* housing member adapted to accommodate said foreign load;

said housing member including a pair of cupped recesses extending [from the top wall thereof] *therefrom* and adapted to fit over the adjacent ends of said tube members;

an aperture in the end [walls] *wall of each* of said cupped recesses to encompass the protruding conductor pin of *a tube of* each of said [tube members] *tubes* in spaced relationship;

a flat apertured conductive disc member in each of said recesses and with the [apertures] *aperture* thereof adapted to fit upon a pin of [each] *one* of said tubes in sliding electrical contact; and a pair of conductor members [within said housing] connected at one end to [each of said] *the* disc members with the other ends being connectable to said foreign load.

16. A power take-off unit for fluorescent tube receptacles wherein the adjacent ends of spaced tubes and their associated protruding double conductor pins are used for delivering electrical power to a foreign load, comprising:

[an electrically insulated] *a* housing member to accommodate said foreign load;

said housing member including a pair of cupped recesses extending [from the top wall thereof] *therefrom* and adapted to fit over the adjacent ends of said [tube members] *tubes;* an aperture in the end [walls] *wall of each* of said cupped recesses to encompass the pair of protruding conductor pins of each tube [member] in spaced relationship;

a flat apertured conductive disc member in each of said recesses and with the apertures thereof radially spaced from the [apertures] *aperture* in the end [walls] *wall* of [said] *the associated* cupped [recesses] *recess;* a pair of conductor members [within said housing member] connected at one end to said disc members with the other ends being connectable to said foreign load;

a separate pair of apertured conductive discs adapted to fit upon one of the pins of each pair of pins of said [tube members] *tubes* with the edge of [its aperture] *the apertures* in electrical contact therewith and [its] *the* outer periphery spaced from the other [pin] *pins;*

[said] *the* conductive disc on each pin contacting the respective conductive disc within [said] *the* cupped [recesses] *recess* as said cupped [recesses are] *recess is* fitted over the adjacent [ends] *end* of [said] *a* tube [members].

[17. A power take-off unit for fluorescent tube receptacles wherein the adjacent ends of spaced tubes and their associated protruding conductor pins are used for delivering electrical power to a foreign load comprising:

an electrically insulated housing member adapted to accommodate said foreign load;

means for attaching said housing member in close association with the ends of an adjacent pair of tubes;

a pair of insulated conductor members within said housing member connectable therein to said foreign load;

the other ends of said conductor members extending from said housing member and each having apertured conductive disc means attached thereto;

an insulating cup member housing each of said conductive disc means and each being adapted to fit over the ends of said respective tubes with an aperture thereof in electrical contact with only one conductor pin of each tube.]

[18. A power take-off unit in accordance with claim 17 adapted for use with single pin tubes in which:

said apertured conductive disc means comprises a single disc within each cap member.]

[19. A power take-off unit in accordance with claim 17 adapted for use with double pin tubes in which:

said apertured conductive disc means comprises a single disc having two spaced apertures therethrough one of which is in electrical contact with one pin and the other of which encompasses the other pin in spaced insulated relationship.]

[20. A power take-off unit in accordance with claim 17 adapted for double pin tubes in which:

said apertured conductive disc means comprises a pair of apertured discs in each cup member one of which is attached to said other end of a flexible conductor member with its aperture encompassing and spaced from each of said pins and the second of which has its aperture in electrical contact with one of said pins and its outer periphery spaced from the other pin.]

21. A power take-off unit for a [dual tube] fluorescent fixture wherein the adjacent ends of [the] laterally spaced tubes and their associated protruding conductor pins receive electrical power by electrical contact with fixture terminals *and* are used for delivering electrical power to a foreign load, comprising:

[an electrically insulated] *a*housing member adapted to accommodate said foreign [electrical] load;

a pair of spaced conductor members having end portions and extending from said housing member with the length of the [connection and] *conductor member including* end portions substantially less than the length of one of said tubes;

a pair of insulating [cup] members adapted to fit over the ends [of each] of said tubes;

said [cup] *insulating* members having an apertured wall to encompass [each of] said conductor pins; and the end portions of said conductor members comprise bared conductor wires extending diametrically across said apertures within said cap members for engagement against [each of] said conductor pins at said adjacent ends to utilize the voltage differential between the electrical potentials supplied separately to the pins of adjacent tube ends by the generating ends of their ballasts;

the other ends of said conductor [means] *members* being connected [to said housing] for energizing said foreign load.

* * * * *